(12) United States Patent
Crowell (10) Patent No.: US 8,009,516 B2
(45) Date of Patent: *Aug. 30, 2011

(54) UNDERWATER ACOUSTIC POSITIONING SYSTEM AND METHOD

(75) Inventor: Jonathan C. Crowell, Dorchester, MA (US)

(73) Assignee: Ocean Server Technology, Inc., Fall River, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/372,065

(22) Filed: Feb. 17, 2009

(65) Prior Publication Data

US 2009/0196122 A1    Aug. 6, 2009

Related U.S. Application Data

(63) Continuation of application No. 11/464,579, filed on Aug. 15, 2006, now Pat. No. 7,512,036.

(60) Provisional application No. 60/708,741, filed on Aug. 16, 2005.

(51) Int. Cl.
*G01S 3/80* (2006.01)

(52) U.S. Cl. .......................................... 367/128

(58) Field of Classification Search .............. 367/117, 367/124, 127, 131, 134, 12, 138, 128; 340/450, 340/458, 461, 463; 701/213
See application file for complete search history.

(56) References Cited

U.S. PATENT DOCUMENTS

| | | | |
|---|---|---|---|
| 3,896,411 A | 7/1975 | Mackey et al. | |
| 5,119,341 A | 6/1992 | Youngbert | |
| 5,140,927 A | 8/1992 | Tolefson | |
| 5,291,194 A | 3/1994 | Ames | |
| 5,331,602 A | 7/1994 | McLaren | |
| 5,377,165 A | 12/1994 | LaPointe et al. | |
| 5,379,034 A | 1/1995 | O'Connell | |
| 5,579,285 A | 11/1996 | Hubert | |

(Continued)

FOREIGN PATENT DOCUMENTS

WO    WO 02/01248    1/2002

(Continued)

OTHER PUBLICATIONS

International Search Report, in corresponding PCT/US06/31928, issued Mar. 19, 2007.

(Continued)

*Primary Examiner* — Dan Pihulic (74) *Attorney, Agent, or Firm* — Nutter McClennen & Fish LLP (57) ABSTRACT

A method for determining the position of an underwater device includes placement of a plurality of station keeping devices on or below the surface of the water in known positions. A device to locate is provided for placement below the surface of the water, and the device to locate and the station keeping devices are provided with a synchronized time base and a common acoustic pulse time schedule. Each station keeping device sends an acoustic pulse at a time according to the common acoustic pulse schedule. The device to locate receives pulses sent by the station keeping devices and calculates a distance between itself and each station keeping device based upon the time that the acoustic pulse is sent and the time that the pulse is received. The device to locate then calculates its position based upon the distances between the device to locate and the station keeping devices.

18 Claims, 7 Drawing Sheets

U.S. PATENT DOCUMENTS

| | | | |
|---|---|---|---|
| 5,642,330 A | 6/1997 | Santopietro | |
| 5,790,070 A | 8/1998 | Natarajan et al. | |
| 6,058,874 A | 5/2000 | Glenning et al. | |
| 6,416,369 B1 | 7/2002 | Coakley | |
| 6,443,383 B1 | 9/2002 | Stasny et al. | |
| 6,501,704 B2 | 12/2002 | Nishimura | |
| 6,532,192 B1 | 3/2003 | Reid | |
| 6,657,585 B1 | 12/2003 | Kucik | |
| 6,701,252 B2 | 3/2004 | Brown | |
| 6,907,839 B2 | 6/2005 | Kruger et al. | |
| 6,941,226 B2 | 9/2005 | Estep | |
| 6,961,657 B1 | 11/2005 | Wernli | |
| 6,972,715 B2 | 12/2005 | Hollis et al. | |
| 6,989,525 B2 | 1/2006 | Howard | |
| 7,230,881 B2 | 6/2007 | Howard et al. | |
| 7,512,036 B2 * | 3/2009 | Crowell | 367/127 |
| 2002/0140599 A1 | 10/2002 | King | |
| 2005/0058022 A1 | 3/2005 | Kitchin et al. | |
| 2005/0180263 A1 | 8/2005 | Lambert | |
| 2007/0014189 A1 | 1/2007 | Basilico | |
| 2008/0037370 A1 * | 2/2008 | Crowell | 367/127 |
| 2009/0196122 A1 * | 8/2009 | Crowell | 367/127 |
| 2009/0216444 A1 | 8/2009 | Crowell | |

FOREIGN PATENT DOCUMENTS

WO    WO 2007/022233    2/2007

OTHER PUBLICATIONS

SEABED "3010 Multi Purpose System: SEABED 3010-MP" Jul. 15, 2002 [http://webarchive.org/web/20020715153703/http://www.seabed.nl/main_3010.htm].

International Search Report, from PCT/US07/004170, mailed Jun. 19, 2008.

* cited by examiner

UNDERWATER ACOUSTIC POSITIONING SYSTEM AND METHOD

RELATED APPLICATIONS

This application is a continuation of U.S. patent application Ser. No. 11/464,579, filed on Aug. 15, 2006, now issued as U.S. Pat. No. 7,512,036 on Mar. 31, 2009, which claims priority to U.S. Provisional Patent Application No. 60/708,741, filed on Aug. 16, 2005, and entitled "Underwater Acoustic Positioning System," both of which are hereby incorporated by reference in their entirety.

FIELD OF THE INVENTION

The invention relates to systems for locating the position of an object and, in particular, to an acoustic system for locating the position of an object located underwater.

BACKGROUND

A system that accurately determines the position of an underwater device would be highly useful for a number of underwater activities. GPS can provide very accurate position location information on the surface of the globe. GPS refers to the Global Positioning System, a constellation of more than two dozen GPS satellites that broadcast precise timing signals by radio to electronic GPS receivers which allow them to accurately determine their location (longitude, latitude, and altitude) in real time. GPS receivers calculate their current position (latitude, longitude, elevation), and the precise time, using the process of trilateration after measuring the distance to at least four satellites by comparing the satellites' coded time signal transmissions. However, since radio waves at the frequency of GPS attenuate very quickly in seawater, the radio-based system cannot be directly used underwater.

Acoustic transmission works very well in water, with low losses, at a sound velocity of approximately 1500 meters/second. As a result, acoustic-based positioning systems have generally been used instead of GPS or other radio-based systems for underwater positioning determination.

One type of prior art system for underwater positioning is known as Long Base Line acoustic positioning (LBL). In most LBL schemes, the Device to Locate (DTL) is active and pings when it receives a sound. A signal sending device sends an acoustic signal to activate the DTL, and sender then receives the response ping and determines the time (round trip delay) to the DTL. The roles can be reversed, but no global timing domain is needed underwater. Where devices are located on the surface of the water, the surface devices can use GPS to get a spatial fix.

An LBL system typically has two elements: the first element includes a number of transponder beacons moored in fixed locations on the seabed (or, for example, on buoys fixed to the sea bed), and the second element consists of an acoustic transducer in a transceiver that is temporarily installed on a vessel or tow fish. The positions of the beacons are described by a coordinate frame fixed to the seabed, and the distances between them form the system baselines. The distance from a transponder beacon to the transceiver is measured by causing the transducer to transmit a short acoustic signal that the transponder detects and then responds to by transmitting an acoustic signal. The time from the transmission of the first signal to the reception of the reply signal is then measured. Since sound travels through water at a known speed, the distance between the transponder beacon and the transducer can then be estimated. The process is repeated for each of the remaining transponder beacons, allowing the position of the vessel relative to the array of beacons to be calculated or estimated.

In principle, navigation can be achieved using just two seabed transponder beacons. In such a case, however, which side of the baseline the vessel is located on may be ambiguous. In addition, the depth or height of the transducer must be assumed (or separately measured accurately). Three transponder beacons is therefore the minimum required for unambiguous navigation in three dimensions and four is the minimum required if redundancy is desired to allow for checks on the quality of navigation. The LBL system works very well, but requires that both the buoys and DTLs transmit data increasing the amount of acoustic bandwidth requires as the number of DTLs are increased, limiting the amount of DTLs that can participate in the scheme. The complexity and power consumption of the DTLs system is increased significantly as it must also transmit data to the buoys.

Another type of prior art system for underwater positioning is known as Short Base Line (SBL) positioning. An SBL system is normally fitted to a vessel, such as a barge, semi-submersible, or a large drilling vessel. A number of acoustic transducers are fitted in a triangle or rectangle on the lower part of the vessel. There are at least three transducers, but the typical number is four. The distance between the transducers (the baselines) are caused to be as large as is practical, typically a minimum of 10 meters. The position of each transducer within a co-ordinate frame fixed to the vessel is determined by conventional survey techniques or from an "as built" survey of the vessel.

SBL systems transmit from one, but receive on all transducers. The result is one distance (or range) measurement and a number of range (or time) differences. The distances from the transducers to an acoustic beacon are measured in a manner similar to what has been described for the LBL system, allowing the position of the beacon to be computed within the vessel co-ordinate frame. If redundant measurements are made, a best estimate can be calculated that is more accurate than a single position calculation. If it is necessary to estimate the position of a vessel in some fixed, or inertial, frame, then at least one beacon must be placed in a fixed position on the seabed and used as a reference point.

With an SBL system, the coordinate frame is fixed to the vessel, which is subject to roll (change in list), pitch (change in trim) and yaw (change in heading) motion. This problem must be compensated for by using additional equipment such as a vertical reference unit (VRU) to measure roll and pitch and a gyrocompass to measure heading. The coordinates of the beacon are then transformed mathematically to remove the effect of these motions. The SBL system suffers the same problems as the LBL system, namely; required underwater bandwidth increases linearly as you add more devices to locate, increased complexity of DTL hardware/software and very difficult setup of the system.

The terms Long Base Line and Short Base Line are used because, in general, the baseline distances are much greater for Long Base Line than for Short Base Line positioning (and even Ultra-Short Base Line positioning; USBL). Because the baselines are much longer, an LBL system is more accurate than SBL and USBL. LBL also has the advantage of positioning the vessel or other object directly in a fixed, or inertial, frame. This eliminates most of the problems associated with vessel motion. In all these systems, the array of seabed beacons needs to be calibrated. There are several techniques available for achieving this, with the most appropriate one being dependent on the task and the available hardware.

There are other prior art systems that provide underwater position determination, including that disclosed in U.S. Pat. No. 5,119,341 to Youngberg, entitled "Underwater GPS System." The Youngberg scheme is essentially the direct transposition of GPS coding techniques for underwater use, wherein satellites are replaced by buoys and radar waves are replaced by acoustic waves traveling from the buoys to underwater mobiles. The equipment on board the underwater body has an architecture that is very similar to the one encountered in a GPS receiver. A stabilized clock is used for accurate measurement of the time of arrival of the acoustic pulses transmitted sequentially by the buoys. Knowing the velocity of sound in water, it is then possible to calculate the distance to the buoys.

The Youngberg methodology is a full GPS-like scheme, wherein the surface buoys send coded information similar to that sent by the GPS satellites. The device underwater keeps a stabilized clock, compares the arrival time of the start of a message, and uses the time sent data in the message along with the buoy location. A disadvantage of this scheme is that it relies on receiving some very long messages in the noisy underwater environment. The Youngberg system also has the buoys free floating or moving and sends position data on the buoys location on a regular basis. This results in even further complexity in the data message, wherein the time of the start of the data, along with the TIME SENT and LOCATION OF BUOY message data, is required to locate position. It can be very difficult to send high bandwidth acoustic data in the noisy ocean environment, making this approach difficult in practice. In a practical sense the Youngberg scheme requires that the DTLs have a clear data channel from each of the buoys down to the DTLs using an acoustic modem or they can't identify their position, in the underwater acoustic environment this is very difficult to achieve.

The GPS Intelligent Buoys scheme (GIB) is disclosed in U.S. Pat. No. 5,579,285 to Hubert, entitled "Method and device for the monitoring and remote control of unmanned, mobile underwater vehicles." This system uses a scheme wherein buoys on the surface listen for data sent up from the DTL. Other data is sent back down from the buoys. It is similar to the Youngberg scheme, but instead uses upward acoustic flow of data. The tracking principle is based on measuring the time of arrival at a set of buoys of an acoustic pulse sent by the DTL at a known time. At a regular interval, each buoy transmits to a processing center its D-GPS position and the time of arrival of the acoustic pulses. Knowing the sound velocity, distances from the buoys to the DTL are easily calculated. The minimum number of buoys to deploy is two, as there are only two unknowns, the mobile's depth being sent upwards using a telemetry channel. Some small number of mobiles can be tracked together using time or frequency diversity. The GIB system is limited by the fact that each underwater device to locate (DLT) must use some of the limited underwater acoustic communication channel to send acoustic data to the surface buoys, and therefore the number of devices being tracked is limited to a small amount.

SUMMARY OF THE INVENTION

The invention provides systems, methods, and devices that allow a device to locate to determine its position underwater. The invention can provide robust and reliable position calculations that, in exemplary embodiments, are accurate within one meter despite noisy underwater conditions, even where several devices to locate are deployed with the system.

In a first aspect of the invention, a method for determining the position of an underwater device is provided. The method includes placement of a plurality of station keeping devices on or below the surface of the water in known positions. A device to locate is provided for placement below the surface of the water, and the device to locate and the station keeping devices are provided with a synchronized time base and a common acoustic pulse time schedule. Each station keeping device sends an acoustic pulse at a time according to the common acoustic pulse schedule. The device to locate receives pulses sent by the station keeping devices and calculates a distance between itself and each station keeping device based upon the time that the acoustic pulse is sent and the time that the pulse is received. The device to locate then calculates its position based upon the distances between the device to locate and the station keeping devices.

In a further aspect of the invention, a system for determining the position of an underwater device to locate is provided. The system includes a plurality of station keeping devices on or below the surface of the water. Each station keeping device has a means for determining its position, a means for keeping time, a transducer for generating acoustic pulses in the water, a memory for storing a schedule of acoustic pulses, and a processor in communication with the memory and the transducer for directing the generation of acoustic pulses according to the schedule. At least one device to locate is also provided. The device to locate includes a means for keeping time, a memory for storing the schedule of acoustic pulses and a known position for each station keeping device, an acoustic transducer for receiving pulses sent by the station keeping devices, and a processor configured to calculate the position of the device to locate underneath the water based upon the arrival time of the acoustic pulses. Each means for keeping time in the system is synchronized and each memory stores the same schedule of acoustic pulses.

In a still further aspect of the invention, a device to locate that can calculate its position underwater in a system having a plurality of station keeping devices on or below the surface of the water is provided. Each station keeping device in the system is located in a known position and includes a means for keeping time that is synchronized with a system time base, a transducer for generating acoustic pulses in the water, a memory for storing a common system schedule of acoustic pulses, and a processor in communication with the memory and the transducer for directing the generation of acoustic pulses according to the schedule. The device to locate includes a means for keeping time that is synchronized with the system time base, a memory for storing the common system schedule of acoustic pulses and the known position for each station keeping device, an acoustic transducer for receiving pulses sent by the station keeping devices, and a processor configured to calculate the position of the device to locate underneath the water based upon the arrival time of the acoustic pulses.

The present invention provides a significant advantage over the prior art systems in that it can use very little acoustic bandwidth and the amount of data is fixed for any number of devices to locate. In the present invention, the signal from each buoy arrives at a known time and has predetermined data (for example, an acoustic ping at a known frequency and duration). The signal is very easy to detect in noisy environments and it leaves most of the underwater acoustic channel available for other uses such as acoustic data modems. In addition, by calculating acoustic attenuation of the locating signals based on distance and adjusting a variable gain amplifier to account for the attenuation, the positioning systems and methods can be made even more robust.

The position determination by a device to locate in the present invention doesn't require that the underwater device transmit any acoustic data, it can simply listen to the transmission from the station keeping devices. This allows the hardware to implement these systems and methods to be very simple, inexpensive, and compact as it is not required to transmit data out from the device. This scheme is also covert where the device doesn't have to transmit acoustic energy to derive it's location.

BRIEF DESCRIPTION OF THE DRAWINGS

The invention will be more fully understood from the following detailed description taken in conjunction with the accompanying drawings.

DETAILED DESCRIPTION

The present invention provides a method and apparatus for locating an accurate 3-dimensional position of an underwater device or vehicle using an acoustic signaling method and a stabilized time base. The stabilized time base can be provided on the device to locate using a stabilized clock. If the depth of the device to locate (DTL) is known, the system requires at least two spatially separated acoustic transmitters (buoys) in fixed locations on the surface of the water. These buoys are referred to as station keeping buoys. An alternative scheme would allow the buoys to be fixed underwater at a known location, not subject to the position error when they are floating, the time base for such a station keeping buoy could be provided by a floating GPS receiver on a cable (GPS time would only be available through the cable) or a stabilized clock such as used in the DTLs. The time on the buoys could also be updated by cable, by coming to the surface from time to time, or some other acoustic scheme that allows it to correct for time drift.

The buoys and any number of underwater receivers (DTLs) have very accurate clocks that are synchronized (i.e., the system has a stabilized time base). The buoys at known locations can send pings at known times based on a shared schedule. The receivers underwater can know the time that the acoustic pulse (ping) should arrive, as well as the pulse amplitude, and can therefore measure the time of arrival very accurately. Where the system uses a single ping from each buoy and knows the time of arrival very accurately (since its position is very well predicted from the last fix), the system can easily identify the signal in a noisy environment, making the system very robust.

Figure 1:
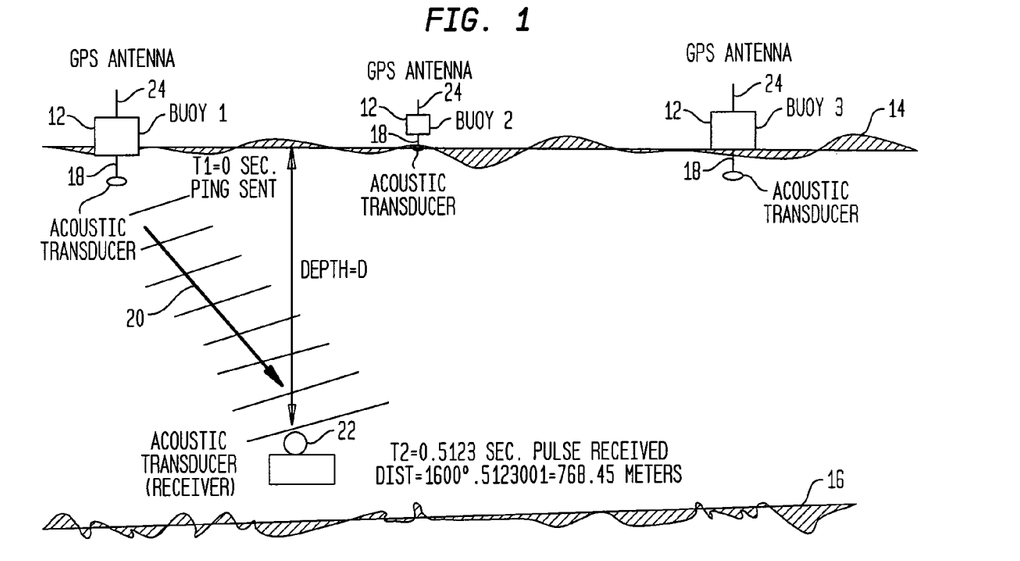
FIG. 1 illustrates a system of the invention having three surface buoys sending timed pulses to a device to locate.

A system 10 of the invention is illustrated in FIG. 1. In the illustrated embodiment, three buoys 12 are provided on the water surface 14. The buoys 12 are generally stationary, and their positions can be stabilized using station keeping compulsion or by being anchored to the seabed 16. The buoys 12 are illustrated on the water surface 14, however, in certain embodiments, they can also be placed below the water surface 14 in known or knowable positions. The buoys 12 include acoustic transducers 18 that can send timed acoustic pulses 20 that can be received by device-to-locate 22 having an acoustic transceiver 26 at a depth D below the water surface 14. In this embodiment, buoys 12 and device-to-locate 22 maintain a stabilized time base. While three buoys 12 are illustrated, it may be possible to use fewer, depending upon the goals for determining the position of device-to-locate 22, and could be more than three for a number of reasons, including for redundancy purposes or increased range of position determining capability. One device-to-locate 22 is illustrated, but any number can be provided, and one advantage that can be provided by the present invention is the ability to determine the position of large numbers of such devices.

In illustrated embodiment, the buoys 12 use a GPS receiver 24 to keep them in a synchronized time domain. The DTLs 22 can have very accurate temperature-stabilized oscillators that are synchronized and calibrated to the common UTC time domain so that when the devices go underwater, they can also maintain the stabilized time base. Every device 12,22 in the system 10 can thus be on a common time base and have a common schedule of acoustic pulses 20. The buoys 12 that transmit acoustic locator pulses 20 can start transmitting simple pings (short burst of acoustic energy, ringing the transducer) on a schedule (using GPS time) from known locations.

The schedule on which the acoustic pulses 20 are based can be a periodic schedule for simplicity, and separated in time so that no two buoys' signals collide in the field of interest where the device-to-locate 22 receivers 26 operate. The underwater devices can know their starting location when they first go underwater, using a GPS fix, and can therefore time the arrival of each pulse (knowing the time it was sent and the location of the buoy) and derive an approximate distance to each buoy (speed of sound multiplied by time). Since the DTL knows the distance to each buoy very closely, it can use this fact to ignore pings or acoustic noise in all time windows except the very small window of time when the actual pulse would arrive. The DTL can include an adjustable gain amplifier and can adjust the gain to have the signal strength at a uniform level. In one embodiment, the pulse is a very short duration signal and only the pulse that arrives first (i.e. the shortest path) is of interest, any longer path reflections can be ignored. In this embodiment, the pulse can be a simple ping, i.e., a known signal that has no variation or information contained, so that only its arrival time needs to be determined in order for the DTL to determine its location. While other data may be transmitted or broadcast by the buoys, it is not required by the DTL to determine its position.

The method of the present invention uses short acoustic signals transmitted on a schedule and is very low bandwidth and requires only a one way signal transmission in order for the DTL to determine its position. The DTL can listen for a very simple known signal arriving at a known small window of time. This signal can be of a high amplitude (Sound pressure level) that can be transmitted great distances and is very noise immune. The ping may have reflected signals that arrive at a later time than the direct ping, but these can be ignored since the first pulse travels the shortest distance and is therefore is the first one measured and timed by the DTL. In fact, the ping method is what is used to accurately measure the depth of water under a boat on the ocean. This technique can therefore be used at great depths and can measure the reflected signal in very high noise environments.

The present invention can use low frequency pings, since the pings need not carry any information. The signal is a known value, similar to a "1" in binary. When transmitting data, the signal is unknown, so noise can cause confusion as to the received value ("0" or "1"). In the case of the timing ping, the onset of the signal is all that is used to measure the travel time. Use of a lower frequency allows the signals to travel much further with lower losses.

In a preferred embodiment, the schedule of pulse 20 transmission is set to be quick enough to keep the position updates regular, but spaced long enough apart to avoid confusion in distinguishing the first pulse onset from each buoy from other signals or reflections. The transducer frequency of each buoy can also be different, so as to allow discrimination between buoys in the same time space, or the same frequency may be used but separated in time. The schedule can also be designed knowing the propagation speed, so that if there are areas where two buoys would conflict, i.e. the signal arrival would be at the same time given the transmission time, the schedule can be alternated to guarantee that the second sequence will be separated in arrival time.

Three exemplary Transmission Schedules are presented in Table 1 below. The times shown for these alternative schedules are the times at which the buoys 12 transmit a pulse or ping 20. The device to locate 22 will obtain the arrival time of each ping and, knowing the transmission time and having a common global clock domain, can then calculate the distance to each buoy 12.

TABLE 1

Transmission Schedule 1: Period: 60 seconds

Buoy1: T = 0, 3, 6, ... 57, f = 30 khz
Buoy2: T = 1, 4, 7, ... 58, f = 30 khz
Buoy3: T = 2, 5, 8, ... 59, f = 30 khz Transmission Schedule 2: Period: 60 seconds Buoy1: T = 0, 10, 30, 40, f = 100 khz
Buoy2: T = 5, 20, 35, 50, f = 100 khz
Buoy3: T = 10, 25, 40, 55, f = 100 khz Transmission Schedule 3: Period: 60 seconds Buoy1: T = 0, 3, 6, ... 57, f = 30 khz
Buoy2: T = 0, 3, 6 ... 57 f = 32 khz
Buoy3: T = 0, 3, 6, ... 57 f = 34 khz Transmission Schedule 2 alternates the second transmission, in order to allow for arrival time separation. In these examples, the cycle may be repeated every minute. Transmission Schedule 3 has the pulses transmitted at the same times, but has frequency differences for each buoy so that the signals can be distinguished even if they have the same arrival time at a given point in space.

If the device-to-locate 22 knows its depth using a pressure transducer or other device, it is possible to use a system with only two buoys 12. In this case, while there are two solutions for position, since the approximate solution is known, then the position of the DTL can still be resolved (2 equations, 2 unknowns). With three buoys, X,Y,Z (latitude, longitude and depth) can be resolved, or, if depth is known, one can solve for a more accurate speed of sound (Distance=time*speed of sound). An example of the geometric solution for trilateration (triangulation) can be found in the example presented in conjunction with FIG. 2 below.

When the system is operated with three our more buoys 12 and the receivers 26 (on DTLs 22) are at a known depth D, extra data is available that can be used to calculate the actual average speed of sound in the area between the buoys 12 and DTLs 22. Using trilateration (triangulation), a simple calculation can yield the latitude, longitude, and depth (X,Y,Z) of the DTL. Using two measurements in time, the DTL can also calculate the speed and heading it is moving on. This information can also be used for predicting the time of the next pulse.

Figure 2:
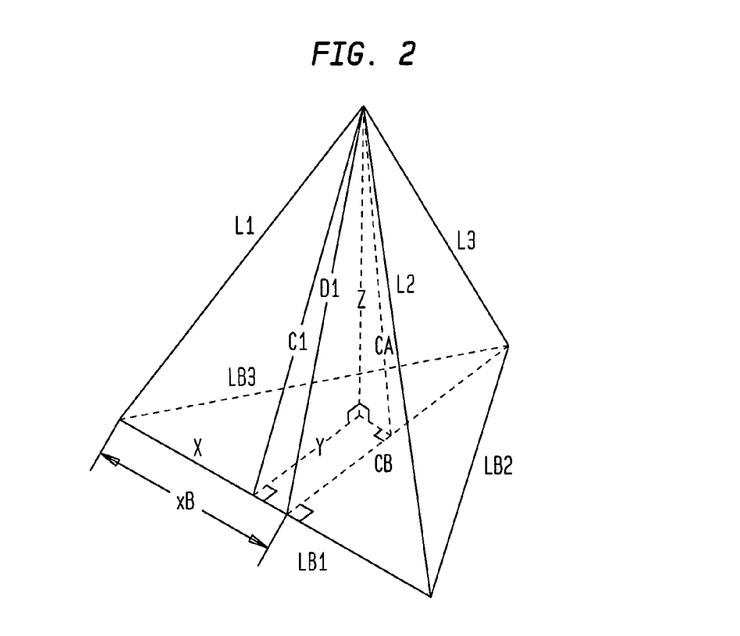
FIG. 2 illustrates a geometrical solution to the problem of locating a point given the distance from three known points, as employed in the present invention.

FIG. 2 pictorially depicts the geometrical solution to the problem of locating a point (i.e., DTL 22) when given its distance ($L_1$, $L_2$, $L_3$) from three known points (i.e., station keeping buoys 12). In this three-dimensional coordinate system, the X-axis is defined as the line between the first and second reference points. The Y-axis is a line perpendicular to the X-axis, passing through the first point, in the plane of the three points, and in the direction of the third point. The Z-axis is defined by a right-handed coordinate system between the X- and Y-axes. By connecting the four points with lines, the tetrahedron is formed. In use with the present invention, the tetrahedron would generally be flipped upside down, with the three known points being the buoys 12 on the surface of the water and the bottom point being the underwater device to locate 22.

Using this geometry, the depth and position of the receiver 22 can be found using a few calculations. The following calculations can be utilized in the present invention to find the 3-dimensional position of a point, given its distance to three known points in 3-dimensional space:

$$X=(L_1^2-L_2^2+L_{B1}^2)/(2L_{B1})$$

$$C_1=(L_1^2-X^2)^{1/2}$$

$$X_B=(L_{B3}^2-L_{B2}^2+L_{B1}^2)/(2L_{B1})$$

$$C_B=(L_{B3}^2-X_B^2)^{1/2}$$

$$D_1=(C_1^2+(X_B-X)^2)^{1/2}$$

$$Y=(D_1^2-L_3^2+C_B^2)/(2C_B)$$

$$Z=(C_1^1-Y^2)^{1/2}$$

The geometry may also be extended to more than three points, allowing one to cancel out the errors in length measurements and/or improve the speed of sound estimation used to calculate the lengths from the transmitters. In addition, the $L_n$ lengths can be converted to time*speed-of-sound and then solved for speed of sound with data from an extra buoy.

The buoy 12 location, although generally or substantially fixed by keeping it on stationary propulsion devices or by anchoring, may still change with wave motion or from tides, currents, or waves pushing it off station. This error can be partially corrected for if the buoy 12 knows the general direction of the receivers 26 (DTLs 22) between the buoys 12. For example, if a buoy 12 moves up 10 feet, the buoy can partially correct for this error by advancing the schedule of sending the ping so that the ping has already traveled 10 feet by the scheduled transmission time. Geometry can yield better error fits for adjusting the launch time, advancing or retarding it in order to help cancel out the errors caused by the movement of the buoy. In this way, the error can be greatly reduced when the arrival pulse is timed at the DTL.

Figure 3:
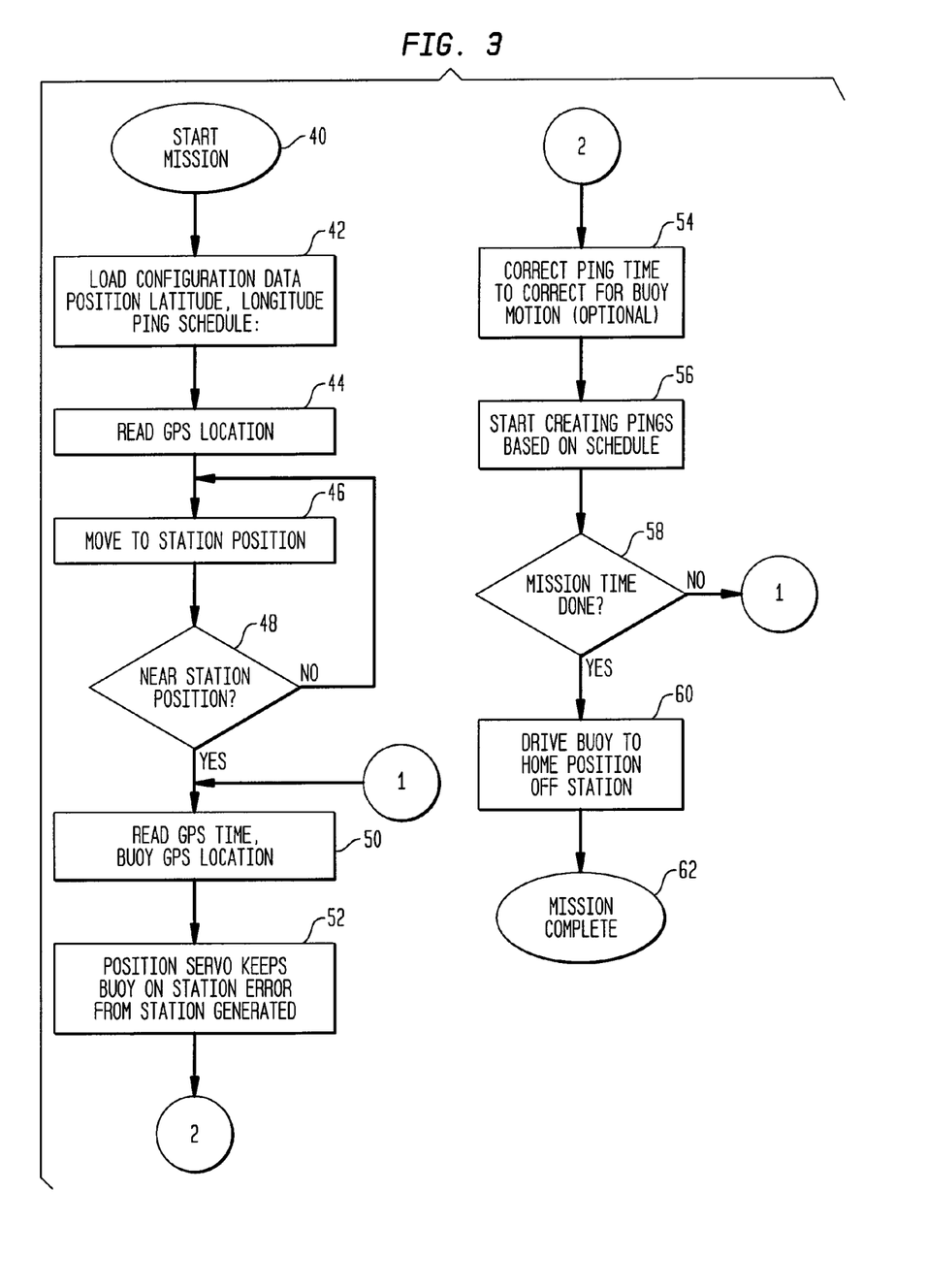
FIG. 3 provides a flow chart illustrating the operation of a station keeping device of the invention.

A basic flow chart for the operation of a buoy 12 is illustrated in FIG. 3. Upon Mission Start 40, configuration data can be loaded on 42 or transmitted to the buoy. The configuration data can include the common ping schedule, or position or time data. The buoy can determine its location, typically by taking a GPS fix 44. Where the buoy includes propulsion, it can move to its desired station position 46, checking its GPS fix along the way to determine when it has reached the station position 48. Once the buoy is within some desired range of its station position, it can read the time and location through its GPS system 50. A position servo can keep the buoy at its station position, and by tracking its position, it can generate the its positional error 52—the distance and direction from its original position. Based on this error, the buoy can correct its position if needed, or it can adjust its ping time with respect to the schedule as described above to account for the positional error 54. Pings can be generated according to the schedule 56 with or without corrections. When the mission is completed 58, the buoy can drive home from is station position 60. Otherwise, the buoy can continue to read its time and location, and process from step 50. Once the buoy reaches home, its mission is complete 62.

Figure 4:
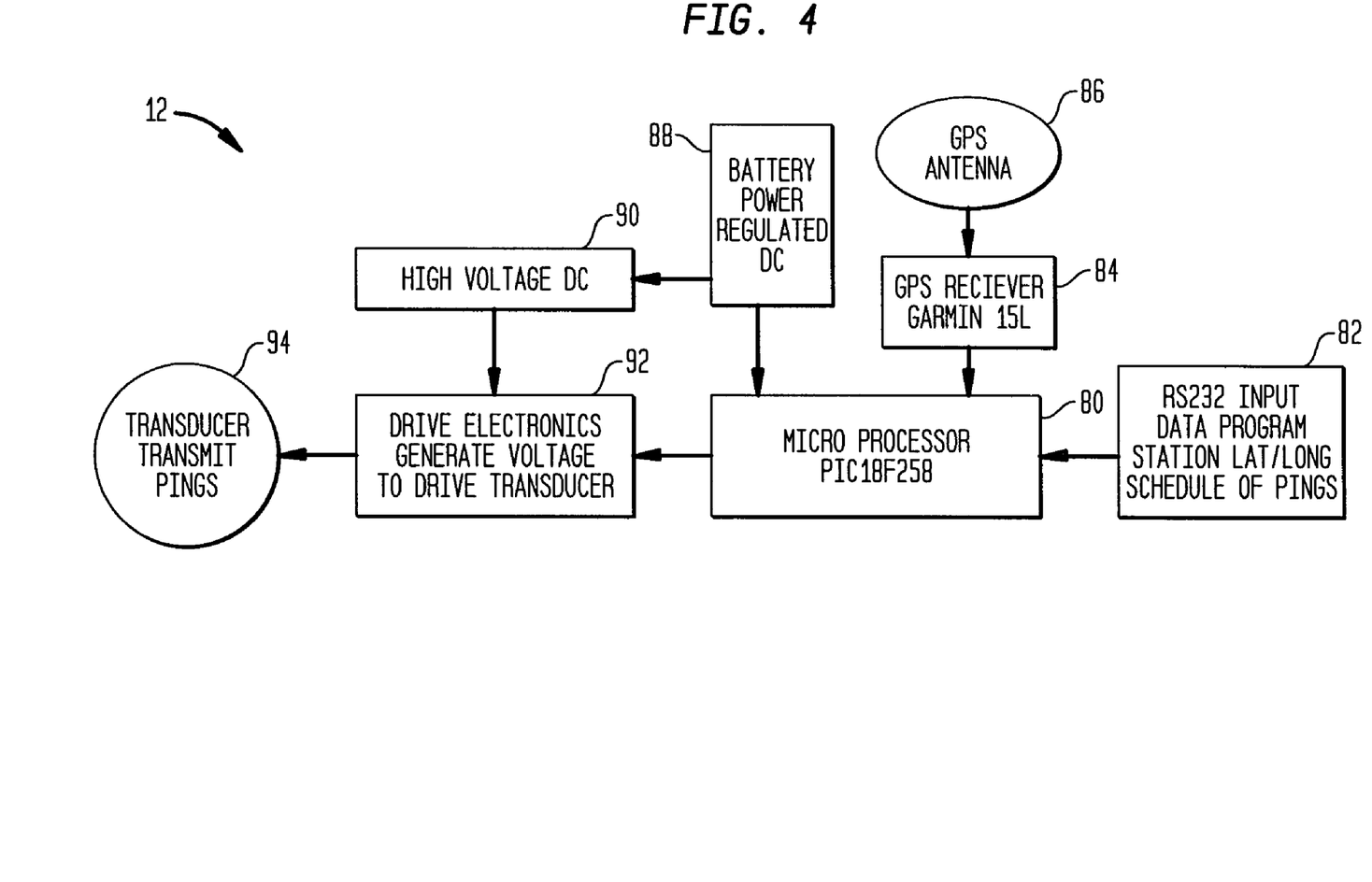
FIG. 4 provides a block diagram illustrating exemplary electronics for operation of a station keeping device of the invention.

FIG. 4 provides a block diagram illustrating the electronic components for one embodiment of a buoy 12 of the invention. The buoy 12 includes a microprocessor 80 that drives the logical operation of the buoy. In one exemplary embodiment, the microprocessor 80 can be a PIC microprocessor available from Microchip Technology, Inc. of Chandler, Ariz., for example a PIC18F258 or similar microprocessor. An RS232 input data program station 82 can be provided to communicate with the microprocessor 80, for example, to load schedule and position data.

A GPS Receiver 84, with associated GPS Antenna 86, are connected to the processor 80. In one exemplary embodiment, the GPS Receiver 84 can be a Garmin OEM system GPS 15L (available from Garmin International, Inc. of Olathe, Kans.). This GPS Receiver 84 can also include a highly accurate one-pulse-per-second (PPS) output. The GPS One-Pulse-Per-Second (PPS) output pulse edge can happen in a synchronized fashion across all GPS receivers in the buoys 12 and is linked to the Atomic Clock domains on the GPS constellation. The output is highly accurate and is provided for the use of applications requiring precise timing measurements. It can be used in the present invention, along with an ASCII time output, to provide a synchronized time base when all devices are above the surface of the water. The DTLs synch onto this time when they are above the water and maintain the time using a temperature-stabilized oscillator when underwater. The GPS PPS signal can be generated after the initial position fix has been calculated and can continue until power down. The rising edge of the signal is synchronized to the start of each GPS second. To obtain the most accurate results, the PPS output can be calibrated against a local time reference to compensate for cable and internal receiver delays and the local time bias.

Buoy 12 electronics also includes a power source such as battery 88 having a regulated DC output to power the microprocessor 80. A high voltage DC converter 90 can also be connected between the battery 88 and drive electronics 92, which drive a transducer 94 to create the ping signals.

Figure 5:
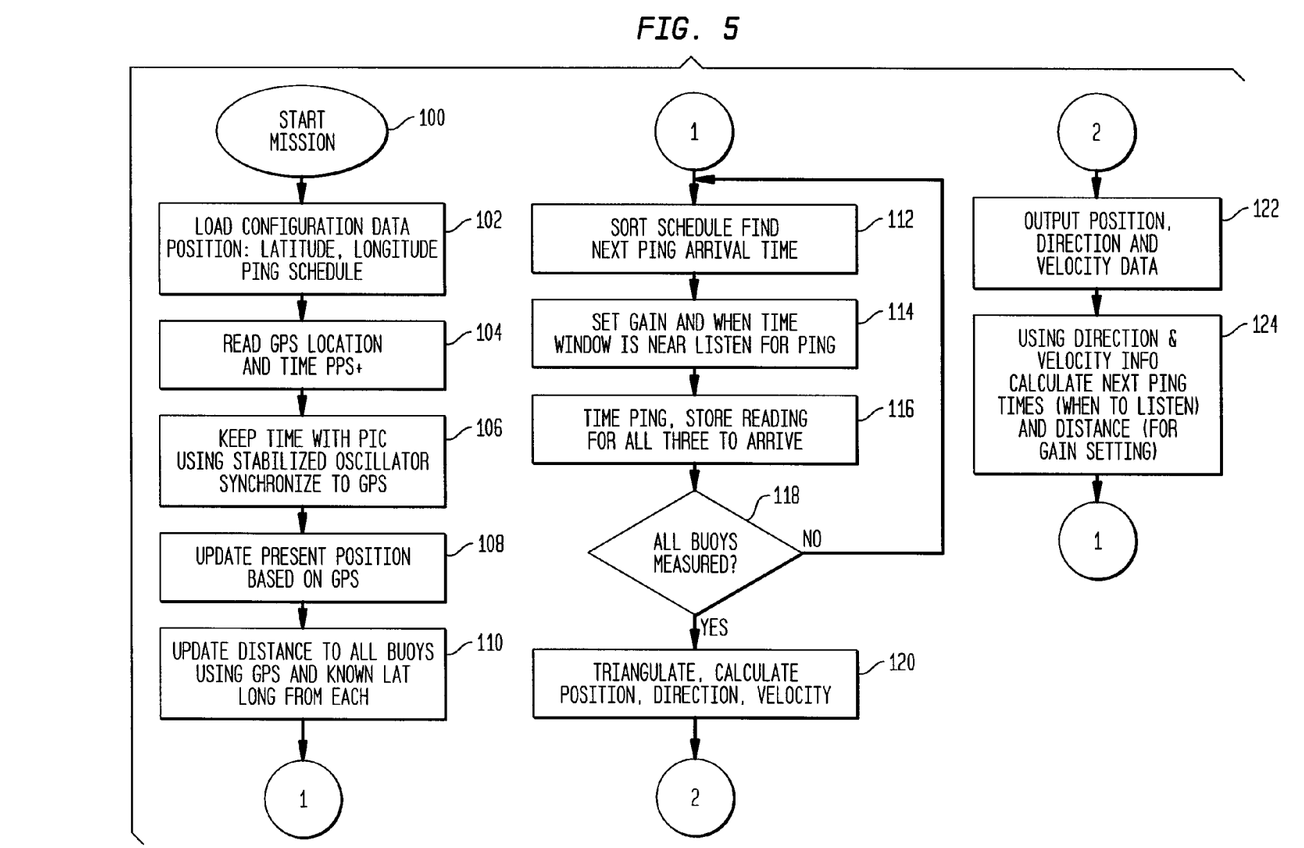
FIG. 5 provides a flow chart illustrating the operation of a device to locate of the invention.

Operation of the DTLs following mission start 100 can be described by reference to the basic flow chart provided in FIG. 5. In general, all data sent from the buoys 12 travels down to one device-to-locate 22, or in further embodiments, a plurality of DTLs, that use the data. The schedule of transmissions and location of the buoys 12, or any other configuration data, can be provided 102 to the DTLs 22 before they submerge, or this data can be sent to the DTLs 22 on a time schedule. Since this type of data can be difficult to send to all areas of a water column, one embodiment of the present invention doesn't require that this information be sent at all, but it can instead be relayed to the DTLs ahead of time, e.g., before the DTLs are placed under water. It is also possible to send this data at a very low data rate along with the acoustic pulse positioning data on some predetermined schedule to the DTLs while submerged using a modulation scheme like an acoustic modem would use. This allows updating the devices with a new schedule while operating if the buoys change. The data can be designed to integrate into the schedule after the pings from a receiver. A few bits of data are sent after each ping, providing the complete data set after some number of pings.

Typically before being placed in the water, the DTL can get a GPS positional fix 104 to determine its current location, and synch to the time domain of the buoys 12, for example, using the PPS methodology described above. The DTL can then keep time 106, for example, by using a stabilized oscillator, the output of which has been synchronized to the GPS time provided by the PPS above. Upon placement in the water, an updated positional fix based on GPS can be obtained 108 and the distance to all buoys calculated 110.

If data on position and schedule is required to be sent to the DTLs after they have been deployed under water, it can be "delta" or change data such as the change in position from some local datum. This could be, for example, feet from a reference point (latitude and longitude of reference point). This allows sending of a small number of bits, say under 32, for each buoy position. Since this data is fairly static, it can be sent with some very robust coding scheme, such as, for example, pulse on a clock at 100 baud, which can be sent very long distances and is very simple to decode.

Once underwater, the DTL can sort the ping schedule to determine the next expected ping arrival time 112. The DTL then listens for a pulse at a known time 114 from a given buoy. Since the DTL knows the distance and time to the buoy, it can watch the window very closely and listen for whether the pulse was transmitted (pulse present=1, absent=0).

When updating the positional fix, the last position and direction is known, and the depth and speed can therefore known very accurately. Based on these, the time when the next position pulse will be received and how far it will travel can also be predicted very accurately. Since the attenuation of the acoustic pulse vs. distance of the medium (e.g. seawater) is also known, one can set the gain on a variable gain amplifier 112, listen for the pulse, and then use the amplitude and arrival time of the pulse to filter out unwanted noise signals. This feature makes this positioning scheme very robust and noise immune and can be accomplished by adjustment of a very stable Logarithmic Amplifier, such as the AD8330 or AD602 amplifiers available from Analog Devices, Inc. of Norwood, Mass. By establishing an expected signal arrival time window, even reflected signals that arrive later can be rejected as being out of the likely time window. If they happen to fall onto another pulse, they can be distinguished by having weaker amplitude than the actual first arrival signal. If they collide exactly, the received signal will merely be stronger. Since the vehicle speed and position is also known from difference between the last two measurements it can be dead-reckoning between calculations so that the position can be reported at a much higher rate. In one embodiment, systems of the invention provide geo-referenced data such as Latitude and Longitude and depth in a given frame of reference such as WGS 84, but it is possible to output position in any reference frame.

If signals are received and the arrival times stored 116 from all active buoys 12, processing can continue 118 with further position, direction and velocity values being calculated based on triangulation from the buoys 120 and outputted 122. The position, direction, and velocity information can then be used to calculate the next signal time 124. The DTL can then return to waiting for the next signal arrival 112. In the case where signals are not received from each active buoy 118, again, the DTL can return to waiting for the next signal arrival 112.

Figure 6:
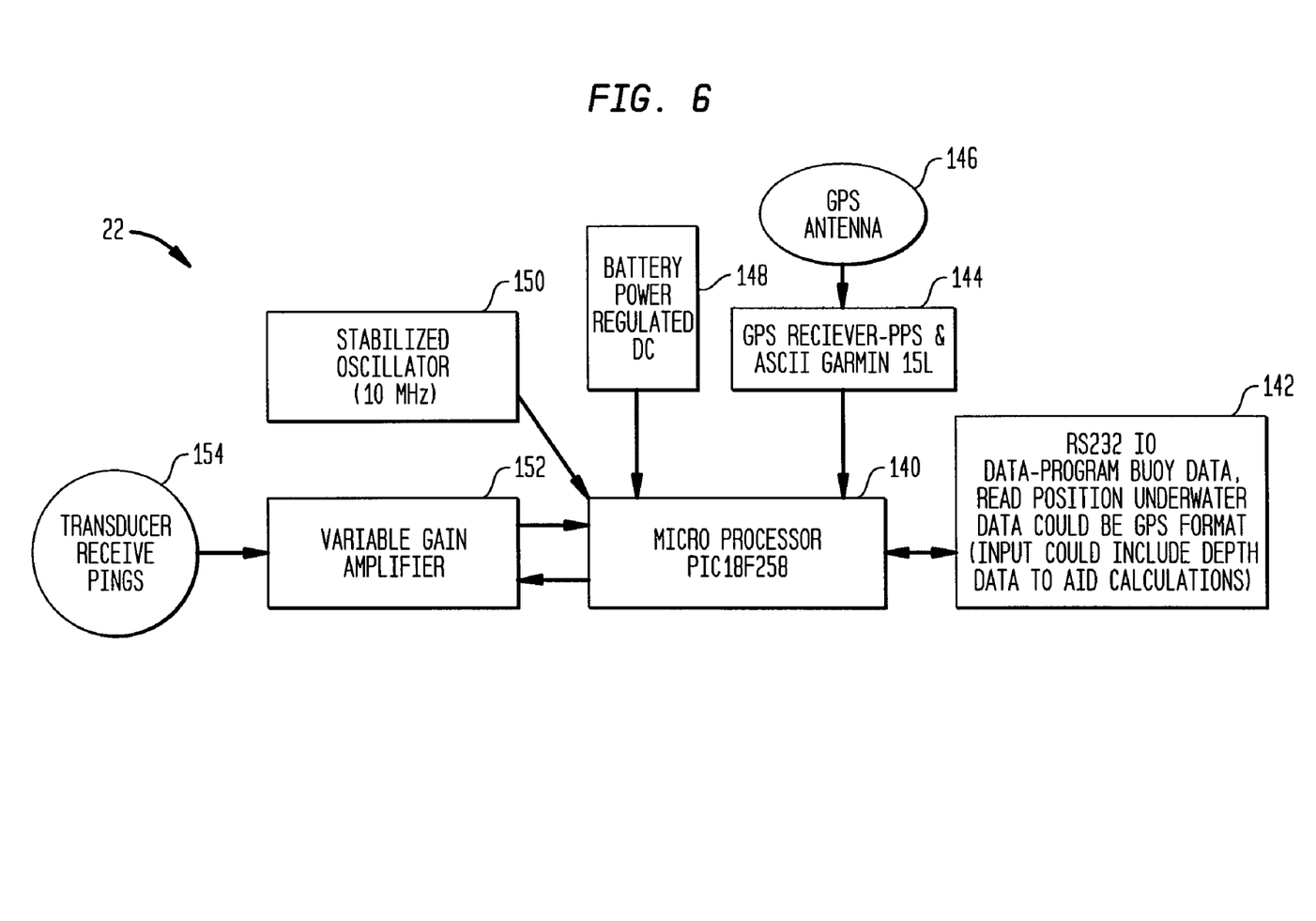
FIG. 6 provides a block diagram illustrating exemplary electronics for operation of a device to locate of the invention.

Referring now to FIG. 6, a block diagram representing the electronics for a DTL 22 of the invention is illustrated. The DTL can include a microprocessor 140, GPS Receiver 144, GPS antenna 146, and battery 148 similar to those provided for the buoy 12 electronics described above. A stabilized oscillator 150 is included to provide for maintaining time synchronization to the GPS atomic clock when the device is working underwater. The oscillator 150 could be, for example, a FOX Model FPC5 AF Series 50.8 mm×50.8 mm oven controlled crystal oscillator, or any other suitable device known in the art. The standard versions of such an oscillator can provide a very low drift of 2 parts per billion when warmed up to their operating temperature after 3 minutes. In the preferred embodiment, this clock may operate at 10 MHz and provide the clock signal for the microprocessor 140. The 10 MHz clock is timed and synchronized to the PPS GPS clock when above water. The stability and accuracy of the oscillator is compared to the GPS clock while the device is above water and any frequency errors can be adjusted out of the system with a correction factor, such as add 5 nanoseconds every second, etc. A low drift clock that is synchronized to the GPS clocks on the buoys, combined with a schedule, can allow the DTL to know apriori when the acoustic data is sent can be an important feature of the devices of the invention. This allows use to time the signal transit time of the acoustic pulse and derives the distance traveled. In a system with 2 ppb of frequency error or better, this can work out to a timing error of 0.86 milliseconds over a 12 hour period underwater, this relates to distance error of 0.13 meter measurement error of the distance from the buoys. This allows for a very accurate sub meter measurement of the underwater position over a useful mission time. More accurate timing (currently available commercial devices have 0.5 or lower ppb of frequency error) will result in more accurate position resolution.

A variable gain amplifier 152, as described above, can be connected to the microprocessor 140, and also to a transducer 154 that receives the acoustic signals from the buoys 12.

In the illustrated embodiment, the electronics for the devices can be very small, something on the order of less than 2 inches square by 0.4 inches thick. The GPS active antennas are on the order of 1 inch×1 inch. The present invention can be implemented entirely using components known in the art, components that are typically available at low cost. The preferred embodiment uses a standard GPS OEM receiver PPS output and a stabilized oscillator tied to a PIC microprocessor. Commercially available GPS synch clock devices suitable for use with the present invention include the GPSClock Model 200 and the Accord GPS Clock NAV2300R-TD1, but any commercially available or specifically developed device known to or devisable by someone of skill in the art would be suitable.

In one embodiment, the device-to-locate can be carried by a diver. For example, the electronics could be placed in a device that could be worn like a wrist watch (using strap 214), and that provides position, depth, speed, distance and/or direction information to the diver. A diagram of such a device 200 is provided in FIG. 7. A display 202 is provided on the device that can illustrate, for example, the direction 204 and 206 distance to a target 208—in the illustrated embodiment, the target is "home." A push button 212 can be provided to change the current function of the device, for example by providing direction home or to some other goal, current position, speed and heading, other modes, or to activate a backlight.

Figure 7:
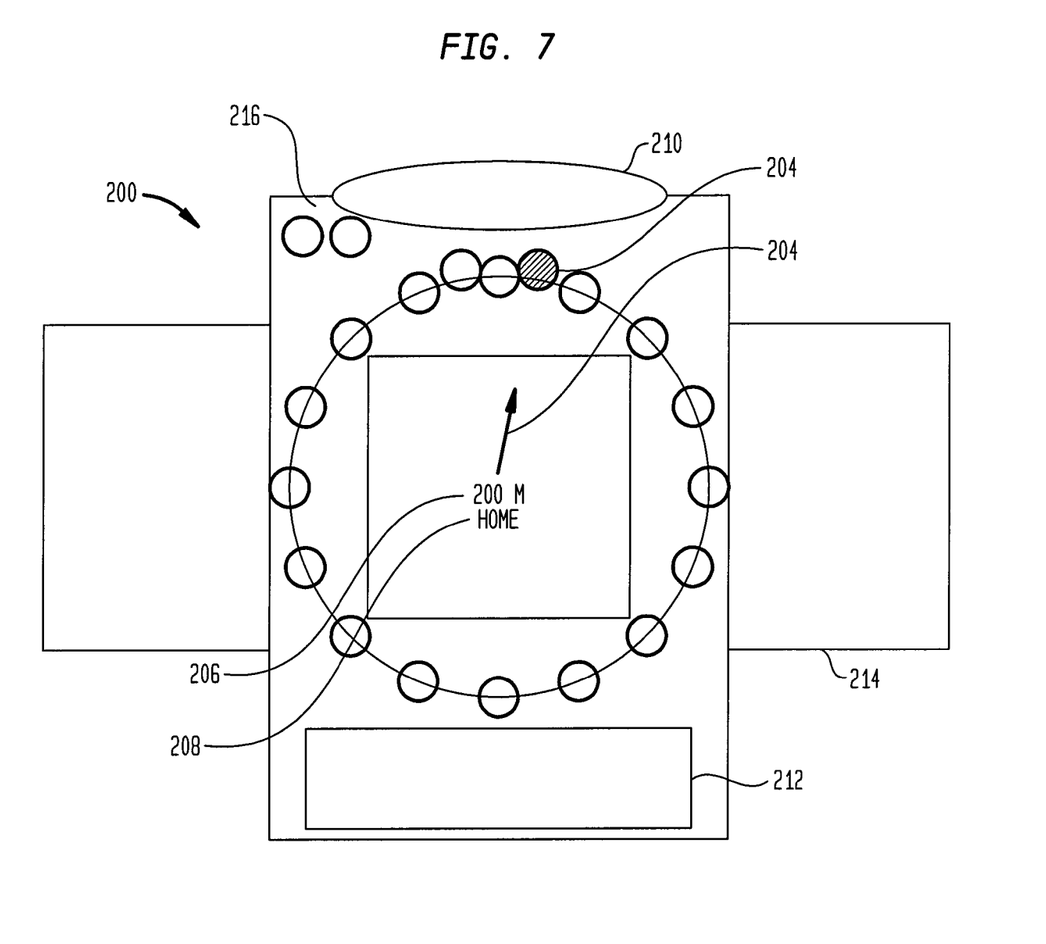
FIG. 7 illustrates a device to locate of the invention having a display.

Device-to-locate 200 also includes an acoustic transducer element 210. The transducer can be receive only, or it can receive and send acoustic pulses. A signal strength indicator 216 can give the wearer a sense for how well acoustic pulses are being received. The send or transmit feature could be used to send data to buoys 12 or other devices, or to send a reply ping when a ping is received from a buoy. A reply ping would allow the buoys to determine the position of the DTL (based on the return trip time from the original pulse being sent to the reply pulse being received) as well as allowing the DTL to determine its own position. If sending data, the transmissions could be based on time slots. The device 200 could also be configured to broadcast an a message, for example, based on the position of the device or to provide for an emergency message to be broadcast by a diver. If the diver had strayed too far from the buoys for example, the device could flash an alarm for the diver, and also alert the buoys. A variety of other sensors could also be integrated into the device, and could be configured to trigger alarms. For example, a heart rate sensor, a blood oxygen level sensor, or a tank pressure sensor could be integrated with the device.

Figure 8:
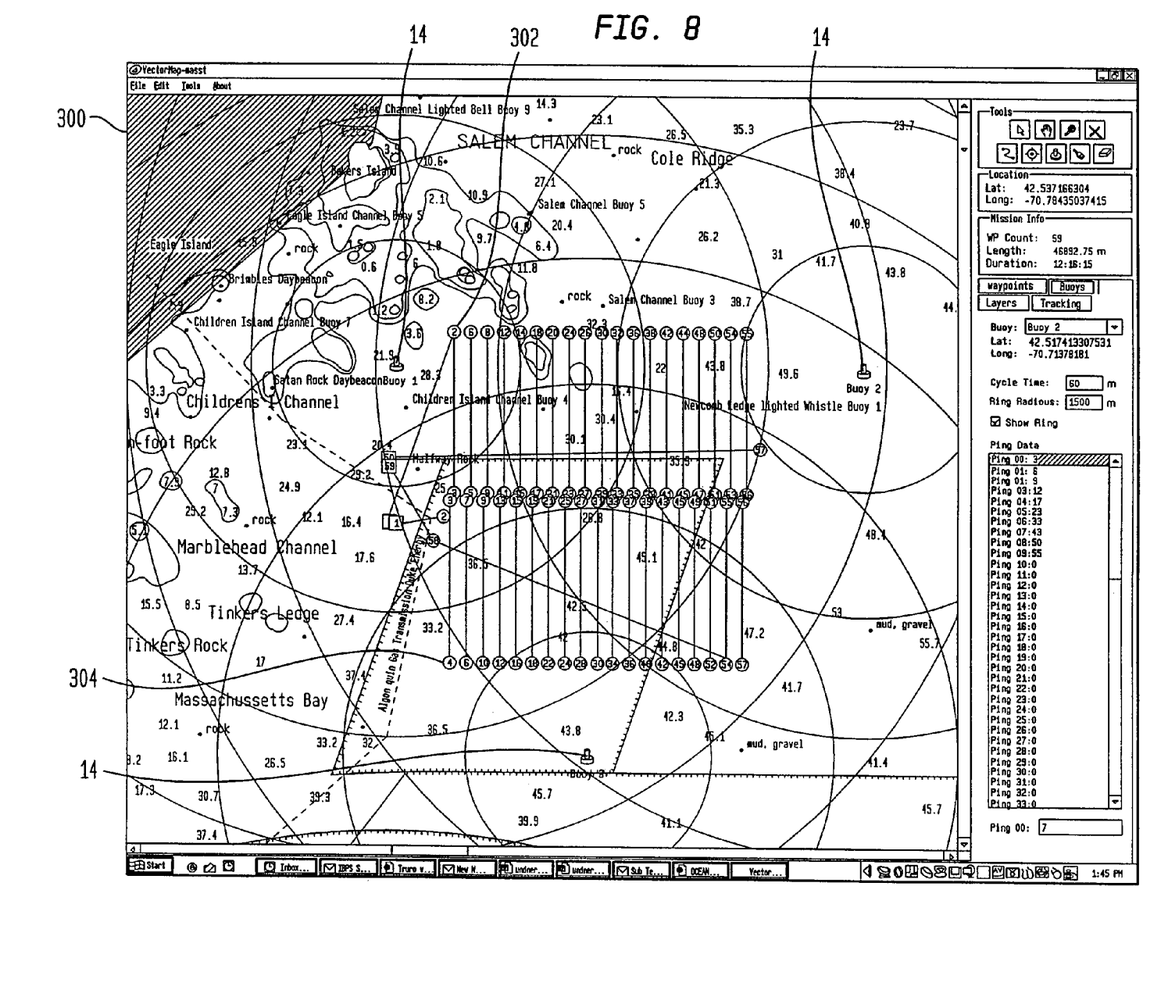
FIG. 8 illustrates mission planning software useful with systems and methods of the invention.

In addition, the device to locate could comprise an unmanned underwater vehicle (UUV) or autonomous underwater vehicle (AUV). FIG. 8 provides a screen shot of a vector map software system that allows mission planning for, e.g., an AUV. The Figure shows the location on a map 300 of three buoys 14. The planning software can be used to layout a desired path for one or more AUVs to follow in carrying out a mission. In this case, a first AUV path 302 and a second AUV path 304 will direct a first AUV and a second AUV, respectively, on back and forth paths appropriate for an undersea mapping mission. Each AUV can be loaded with at least a map of its own mission, and can navigate along its planned path by calculating its positions based on acoustic pulses received from the buoys as described above. The AUVs can further calculate their absolute speed and direction as described above, to further ensure that the AUVs remain on their predetermined courses while performing tasks such as mapping, searching, or security monitoring.

A person of ordinary skill in the art will appreciate further features and advantages of the invention based on the above-described embodiments. For example, specific features from any of the embodiments described above may be incorporated into devices or methods of the invention in a variety of combinations and subcombinations, as well as features referred to in the claims below which may be implemented by means described herein. Accordingly, the invention is not to be limited by what has been particularly shown and described, except as indicated by the appended claims or those ultimately provided. Any publications and references cited herein are expressly incorporated herein by reference in their entirety.

What is claimed is:

1. A system for determining the position of an underwater device to locate, comprising:
   a plurality of station keeping devices on or below the surface of the water, each station keeping device having:
      a means for determining its position,
      a means for keeping time,
      a means for generating acoustic signals in the water,
      a memory for storing an acoustic signal schedule, and
      a processor in communication with the memory and the means for generating acoustic signals in the water according to the acoustic signal schedule;
   at least one device to locate, the device to locate having
      a means for keeping time, a memory for storing the acoustic signal schedule and a known position for each station keeping device, an acoustic transducer for receiving acoustic signals sent by the station keeping devices, and a processor configured to calculate the position of the device to locate underneath the water based upon the difference between the arrival time of the acoustic signals and the scheduled time for sending the acoustic signals;

wherein each means for keeping time is synchronized, and each memory stores the same acoustic signal schedule.

2. The system of claim 1, wherein calculating a position of the device to locate comprises a triangulation calculation.

3. The system of claim 1, wherein the time that the acoustic signal is received is determined by detecting the onset of the acoustic signal.

4. The system of claim 1, wherein the processor on the device to locate calculates a likely time window for the receipt of an acoustic signal based at least upon a calculated position of the device to locate and the device to locate listens for the acoustic signal during the likely time window.

5. The system of claim 4, wherein the device to locate calculates a velocity and direction of motion of the device to locate based upon at least two calculated positions of the device to locate, and the calculation of a likely time window is based upon at least the calculated velocity.

6. The system of claim 1, wherein the processor on the device to locate calculates an acoustic signal attenuation value and filters noise based at least upon the amplitude of the acoustic signal.

7. In a system having a plurality of station keeping devices on or below the surface of the water, a method for an underwater device to determine its location, comprising:

providing the underwater device with an acoustic signal time schedule, the acoustic signal time schedule indicating a time at which each station keeping device will emit an acoustic signal into the water;

receiving by the underwater device an acoustic signal from each station keeping device, the acoustic signals being sent from each station keeping device according to the acoustic signal time schedule;

calculating by the underwater device a distance between the underwater device and each station keeping device based upon the scheduled time for sending the acoustic signal and the time that the acoustic signal is received; and calculating by the underwater device of a position of the underwater device based upon the distances between the device to locate and the station keeping devices.

8. The method of claim 7, wherein calculating a position of the underwater device comprises a triangulation calculation.

9. The method of claim 7, wherein the time that the acoustic signal is received is determined by detecting the onset of the acoustic signal.

10. The method of claim 7, wherein a processor on the underwater device calculates a likely time window for the receipt of an acoustic signal based at least upon a calculated position of the underwater device and the underwater device listens for the acoustic signal during the likely time window.

11. The method of claim 10, wherein the underwater device calculates a velocity and direction of motion of the device to locate based upon at least two calculated positions of the underwater device, and the calculation of a likely time window is based upon at least the calculated velocity.

12. The system of claim 7, wherein a processor on the underwater device calculates an acoustic signal attenuation value and filters noise based at least upon the amplitude of the acoustic signal.

13. A system for determining the position of an underwater device to locate, comprising:

a plurality of station keeping devices on or below the surface of the water, each station keeping device having:

a GPS receiver for determining its position, a clock for keeping time, an acoustic transducer for generating acoustic signals in the water, a memory for storing an acoustic signal schedule, and a processor in communication with the memory and the acoustic transducer for generating acoustic signals in the water according to the acoustic signal schedule;

at least one device to locate, the device to locate having a clock for keeping time, a memory for storing the acoustic signal schedule and a known position for each station keeping device, an acoustic transducer for receiving acoustic signals sent by the station keeping devices, and a processor configured to calculate the position of the device to locate underneath the water based upon the difference between the arrival time of the acoustic signals and the scheduled time for sending the acoustic signals;

wherein each clock is synchronized, and each memory stores the same acoustic signal schedule.

14. The system of claim 13, wherein calculating a position of the device to locate comprises a triangulation calculation.

15. The system of claim 13, wherein the time that the acoustic signal is received is determined by detecting the onset of the acoustic signal.

16. The system of claim 13, wherein the processor on the device to locate calculates a likely time window for the receipt of an acoustic signal based at least upon a calculated position of the device to locate and the device to locate listens for the acoustic signal during the likely time window.

17. The system of claim 16, wherein the device to locate calculates a velocity and direction of motion of the device to locate based upon at least two calculated positions of the device to locate, and the calculation of a likely time window is based upon at least the calculated velocity.

18. The system of claim 13, wherein the processor on the device to locate calculates an acoustic signal attenuation value and filters noise based at least upon the amplitude of the acoustic signal.

* * * * *